July 27, 1965

J. LAU 3,197,386

PLURAL STAGE STEAM DISTILLATION APPARATUS
FOR PURIFYING OILS AND FATS

Filed Aug. 22, 1961

INVENTOR
JURGEN LAU

BY *McGlew and Toren*

ATTORNEYS

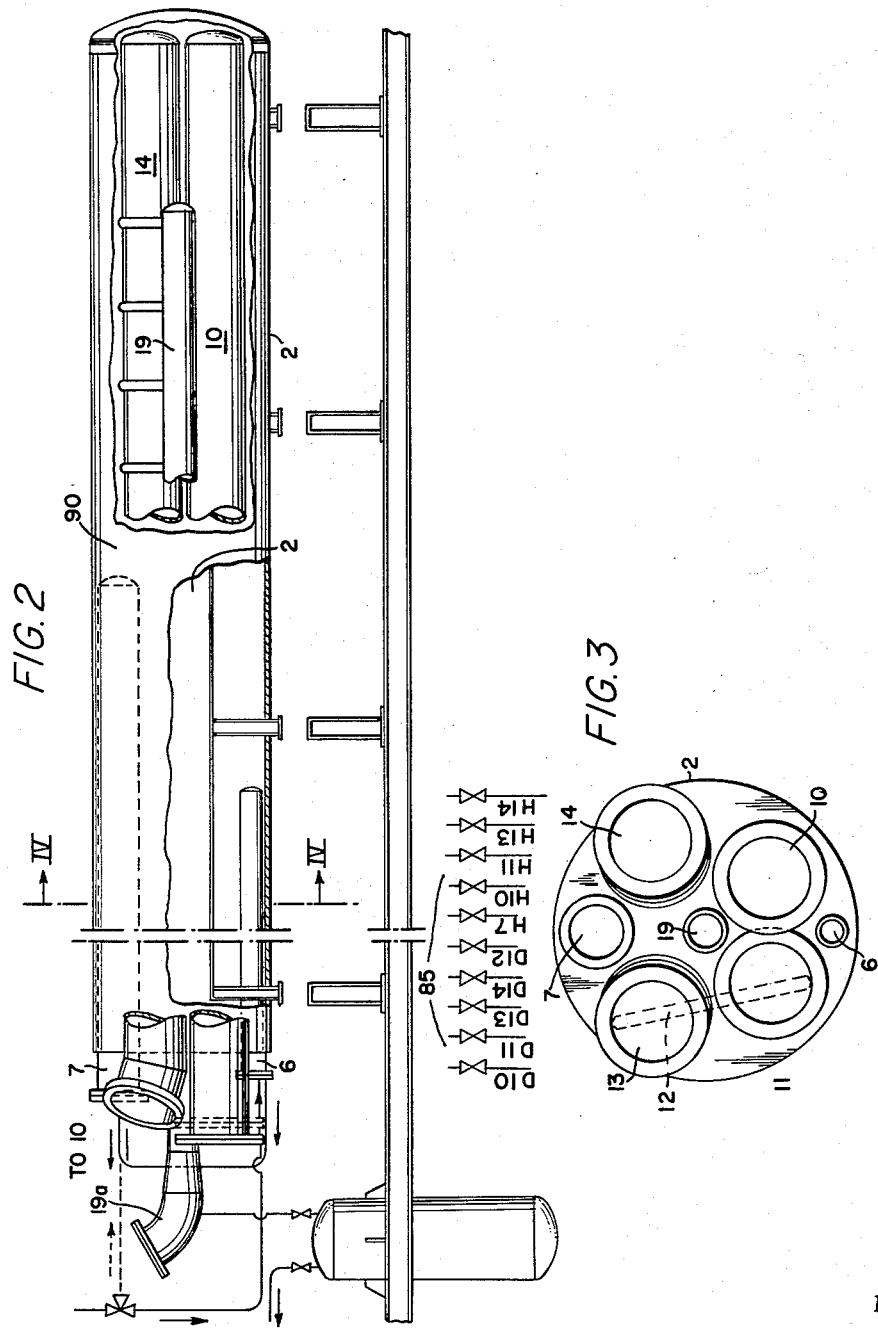

United States Patent Office 3,197,386
Patented July 27, 1965

3,197,386
PLURAL STAGE STEAM DISTILLATION APPARATUS FOR PURIFYING OILS AND FATS
Jurgen Lau, Deggendorf (Danube), Germany, assignor to Deggendorfer Werft und Eisenbau, G.m.b.H., Deggendorf (Danube), Germany, a corporation of Germany
Filed Aug. 22, 1961, Ser. No. 133,205
Claims priority, application Germany, Aug. 26, 1960, D 34,111
18 Claims. (Cl. 202—173)

This invention generally relates to oil refining and purification and is more particularly concerned with apparatus for steam treating oils and fats for the purpose of removing undesired odorous and/or flavorous substances.

For the purpose of this application, including the appended claims, the term "oil" is deemed to include and connote all oils and fats, and in particular edible oils and fats, which are used in, e.g., the food industry and which contain undesired components or contaminants that are capable of removal by steaming.

It is known in the art to remove flavorous and odorous substances from oils to be used as nutritive or carrier components in food by heating the oils under subatmospheric pressure conditions while at the same time introducing direct steam into the oil. Undesired substances which affect taste and odor are thereby carried off by the steam. Steam treatment or steaming is also utilized in the art for the purpose of neutralizing the raw material. Thus, certain fatty acids and other substances in the oil will distill off when the oil is subjected to steaming. The optimum conditions as to the period of steaming, the amount of carrier steam to be introduced, the vacuum value, the oil temperature and other factors on which a successful steaming procedure is dependent are in each case determined by experiments which are based on physical laws so that the desired interplay between the various factors takes place in the most advantageous manner.

Recent literature contains ample references to research and experiments which have been carried out in connection with the refining or purification of edible oils and fats. Thus, it has been ascertained that the construction material of the apparatus with which the oil comes into contact during the steaming procedure is of great consequence, as certain metals commonly used as building materials exert catalytic actions on the oils which may seriously affect the degree of purification obtained. Moreover, the quality of the final product is also dependent on the constructional material of the steaming plant and of the storage containers, as again catalytic action may set in which may affect the stability of the purified products. According to the most recent information, nickel and certain alloy steels and other refined steels are most suitable as constructional or building material of the apparatus, as such steel or nickel does not catalytically or otherwise affect the quality of the oil or fat with which it comes into contact.

As is generally known, nickel and alloy steels are expensive materials, and the construction of plants for the steam treatment of edible oils made from such materials is, therefore, extremely, if not prohibitively, expensive.

Accordingly, it is an object of this invention to provide apparatus for steaming oils wherein nickel or alloy steels may be used as structural materials but wherein the individual parts and elements of the apparatus to be contacted by the oil are arranged and designed in such a manner that less structural material is necessary, thereby resulting in a plant which is less expensive and more economical than prior art plants for the same purpose.

In the prior art apparatus for the purpose referred to with batch-wise operation and having a capacity of 2,000 to 20,000 kilograms, the oil is first heated to the desired temperature whereafter the steaming process is initiated by introducing steam at the bottom of the oil-containing vessel. The steam is then distributed through the oil in various ways which, at the same time, are intended to cause agitation of the relatively high liquid column. The flavorous and odorous substances to be removed, and in some instances also free fatty acids, are carried off with the steam through the top or dome portion of the apparatus into a vapor line, receptacles and condensers. In the usual prior art apparatus of this kind, the steaming period, dependent on the type of oil, the temperature and the vacuum, is usually between four and seven hours.

The removal of the flavorous and odorous substances as well as the distillative neutralization, considered from a time point of view, takes place logarithmically. In other words, when the content of undesirable substance or substances decreases in the oil, the amount of undesired substance in the escaping steam equally decreases and the removal of small amounts of contaminants takes, therefore, proportionally longer. As subjecting an edible oil to high temperatures, even if such heating is carried out in vacuum, causes undesirable effects and side reactions and generally affects the quality of the final product in direct proportion to the treatment time, it is desired to shorten the steaming treatment as much as possible.

Of course, in carrying out the steaming, an important factor to be considered is the amount of steam to be consumed, so that the process can be carried out economically. If an excessive amount of steam has to be introduced, then, of course, the water and total steam consumption would make the steaming procedure highly uneconomical.

In prior art constructions, it is usual to increase the capacity and output of the steaming apparatus by providing pumps and agitators which cause an intimate contact between the oil to be treated and the steam by properly agitating the mixture and which provide for the desired vacuum conditions. Thus, so-called giant or mammoth pumps and vapor compressors or boosters are usually employed.

A disadvantage of most prior art constructions, in spite of the fact that many auxiliary measures are taken, is that they cannot be operated continuously and that the treatment time is sufficiently long to affect the quality of the refined product. Semi-continuous and continuous plants for the deodorization of oils have already been introduced in some countries, including the United States, which make use of a plurality of superimposed column plates or bottoms. These known apparatus, however, are not fully satisfactory as the escaping steam tends to condense while still within the reaction space proper and thus drops back into the oil to be steamed, thereby returning the substances to be removed. Moreover, these known semi- or fully continuous plants operate with considerable losses of oil as the steam tends to carry off not only undesirable substance to be removed, but also significant amounts of oil droplets of the edible raw material proper.

In addition, the prior art constructions are extremely heavy, use large quantities of expensive structural material and have a considerable constructional height, which makes it difficult to accommodate, to operate and to maintain them. In addition, the great height of these apparatus renders it extremely difficult to maintain a sufficient vacuum in the system, particularly in the lower chambers.

Accordingly, it is another object of this invention to overcome the disadvantages of prior art steam treatment apparatus by providing apparatus for continuously steaming edible oils which is easily constructed with a minimum of construction material, is of rugged design, is inexpensive to build and is easy to maintain and control.

Another object of this invention is to provide apparatus for the purification and refining of oils by steaming, wherein the oil to be purified is intimately mixed with steam and the undesirable constituents such as flavorous and odorous substances are removed to a satisfactory extent within a very short period of time and without affecting the quality of the refined product.

It is also an object of this invention to provide steaming apparatus adapted for the treatment of oils which may be continuously operated and wherein the necessary vacuum is readily maintained.

Still another object of this invention is to provide a steaming plant for the purification of oils, wherein substantially no losses of oil are incurred during operation. It is also an object of this invention to provide a steaming apparatus for the treatment of oils which is of low height.

Another object of this invention is generally to improve on the art of steaming apparatus for the treatment of oils and fats as hitherto practiced.

These and other objects of the invention and advantages pertaining thereto will become more clearly understood when read in conjunction with the following detailed description thereof, particularly with reference to the accompanying drawings, wherein:

FIG. 2 illustrates a longitudinal elevation of the steaming container proper on enlarged scale with some parts broken away;

FIG. 3 is an end view of the steaming container; and

Briefly, and in accordance with this invention, a steaming container in which the steaming procedure proper is carried out, comprises a horizontally extending cylindrical shell accommodating a plurality of parallel steaming tubes which extend in the longitudinal direction of the container, through which steaming tubes the oil to be treated is conveyed successively in opposite directions. A vapor collecting tube is arranged parallel to the steaming tubes and is connected with the individual steaming tubes, while heat exchangers may be operatively connected to the inlet side of one of the steaming tubes and the outlet side of another one.

Figure 1:
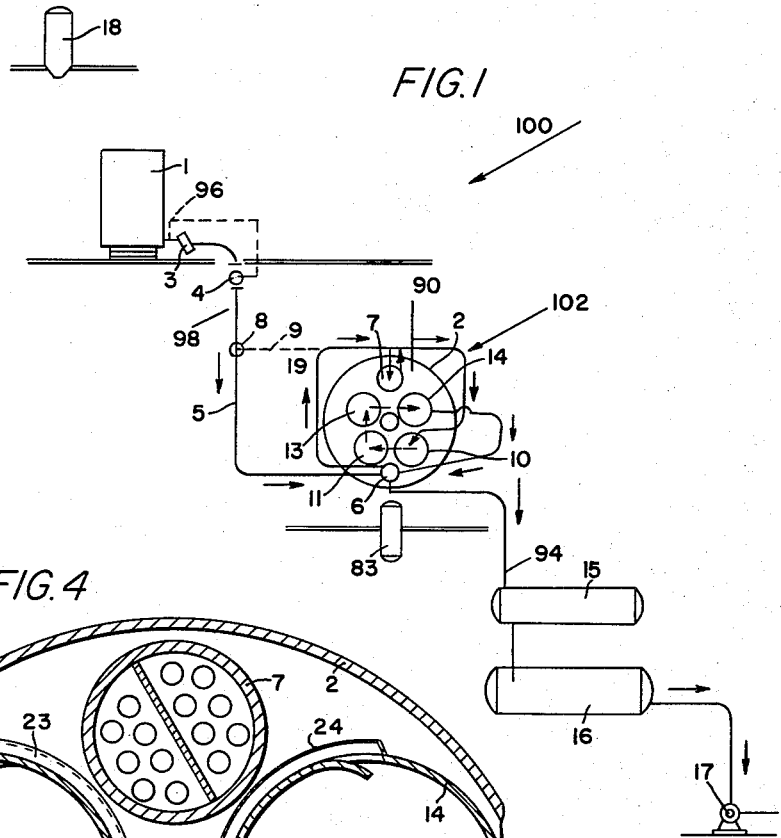
FIG. 1 is a schematic representation of a steaming plant in accordance with this invention.

Referring now to the drawings, and in particular to FIG. 1, reference numeral 100 generally indicates schematically a plant for refining oils and fats for the purpose of removing undesirable constituents such as flavorous and/or odorous substances. The oil to be treated is stored in a storage container or tank 1 which is arranged above the level of a steaming apparatus or vessel generally indicated by reference numeral 102. The particular construction of the steaming apparatus which forms the essence of this invention will be described hereinbelow.

The raw material or oil flows by gravity from the tank 1 into the vessel 102 through a line or pipe generally indicated by reference numeral 98. During its passage from the tank 1 into the container 102, the material passes through a filtering device 3 adjacent the outlet of the tank 1. Solid contaminants are thus filtered off. A dosage or measuring device schematically indicated by reference numeral 4 is connected in line 98 which dosage device 4 acts on the outlet valve 96 of the tank 1 as schematically indicated by dotted line 96 to adjust the desired flow rate. From the dosage means 4 the material flows through pipe portion 5 into a heat exchanger 6 and from there to a preheating device 7. A three-way cock or the like flow-adjusting means 8 is provided in line 98 for the purpose of enabling the bypass of the heat exchanger 6 so that the material can be directed to flow directly through auxiliary line 9 into the preheater 7. Such direct charging of the preheater 7 without first feeding the oil to the heat exchanger 6 is advantageous and desired when the steaming operation is initiated, in order initially to bring the oil to the desired working temperature. The flow direction of the material from the tank 1 into and through the steaming apparatus 102 is indicated by the arrows.

After the material has passed through the preheater 7, it enters a first steaming tube or pipe 10. The oil or raw material is fed to this steaming pipe 10 at the front end face of the steaming container 102. Steaming pipe 10 is operatively connected by a line with a second steaming pipe 11 arranged at the same level as, and parallel with, steaming pipe 10, and after the oil has traversed pipe 10 it reaches pipe 11 at the rear end of container 102 so that the material will now flow through pipe 11 in a direction directly opposite to the flow direction within pipe 10. A third steaming pipe 13 is arranged at a level above pipes 10 and 11 and after the material has passed through pipe 11, it is fed into and through pipe 13 and thereafter through a fourth pipe 14 parallel to pipe 13, the flow direction in successive pipes always being opposite. Pipes 13 and 14, it will be noted, are slightly laterally offset relative to pipes 10 and 11.

In all four pipes 10, 11, 13 and 14, an intimate contact and mixing between the oil and steam takes place, as will become apparent from the following description. A giant or mammoth pump 12 is provided between pipes 11 and 13 for assisting the flow of the oil through the pipes.

After the oil has passed through the pipes, it enters again the heat exchanger 6 where a portion of its heat is dissipated to entering oil emanating from the storage tank 1 and flowing in counter-current. Heat economy is thus preserved. From the heat exchanger 6 the steamed oil flows through line 94 into a cooler 15 and from there into a collecting vessel 16. The refined oil is withdrawn from the collecting vessel 16 by means of a pump as indicated by reference numeral 17.

The entire plant or system is operated under vacuum and for this purpose a barometric condenser 18 is provided as diagrammatically indicated on top of the drawing of FIG. 1. The vacuum is maintained by steam ejectors or jet pumps and may be increased by a booster or vapor compressor which is arranged in the vapor collecting tube 19. As these elements are known in the art, they have not been shown in detail.

The steaming container 102 proper, comprises a cylindrical shell 2 defining the space 90. Space 90 accommodates the four steaming pipes 10, 11, 13 and 14 previously referred to.

Figure 4:
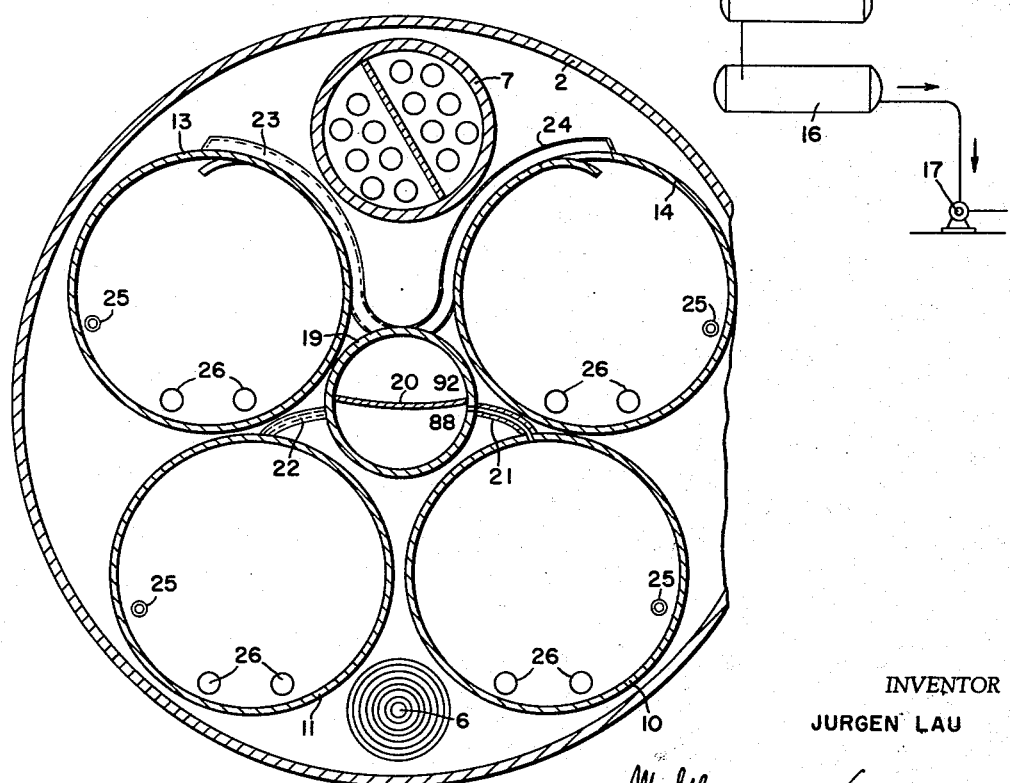
FIG. 4 is a section along line IV—IV of FIG. 2.

It will be noted that concentrically relative to the cylindrical shell 2 of the steaming container 102 and within space 90 there is provided a central vapor collecting tube or pipe 19 as can be best seen in FIGS. 2 and 4. The centrally arranged vapor collecting tube 19, which has a widened end portion 19a, is divided into two chambers 92 and 93 by the provision of a separating wall 20 as can be best seen in FIG. 4. The upper chamber or space 92 is connected with the steaming pipes 13 and 14, respectively, by connecting lines 23 and 24, while chamber 93 is connected with the pipes 10 and 11 by lines 21 and 22. A number of such lines are provided along the extension of the pipes which lines connect and open up into the respective pipes 10, 11, 13 and 14 at the highest circumferential level of the pipes. It will also be noted that the steam collecting tube 19 extends parallel to the steaming pipes.

Steam supply pipes 25 of relatively small diameter are arranged within the individual steaming pipes 10, 11, 13 and 14 and extend eccentrically relative to the axis of the individual pipes but parallel thereto. These steam supply pipes 25 have preferably obliquely shaped, downwardly extending exit openings (not shown) for the direct heating of the raw material and are close to the walls of the pipes. In addition, closed heating pipes 26 for effecting indirect heating of the oil to be treated are arranged in the lower region at spaced locations within the individual pipes 10, 11, 13 and 14 as indicated in FIG. 4.

The oil, while passing through the individual steaming pipes 10, 11, 13 and 14, is thus heated indirectly by the heating pipes 26 and directly by the steam entering through pipes 25. It will, of course, be realized that the number of heating and steam supply pipes is not critical and depends upon the particular circumstances. This, of course, also applies to the number of steaming pipes 10, 11, 13, 14 of which a great number may be provided, if need be.

As previously mentioned, the entire system is operated under vacuum. For this purpose the steaming pipes 10, 11, 13 and 14, via the lines 21, 22, 23 and 24 and via the vapor collecting tube 19, and also the heat exchanger 6 and the preheater 7, are connected to the vacuum creating unit. The same applies to the space 90 defined by the shell 2 of the container 102 and the various tubes and pipes accommodated therein. Due to the pressure equalization within and outside the various tubular elements arranged within the shell 2, relatively thin-walled tubes or pipes may be used which, of course, considerably cuts down on the expense connected with the construction of the apparatus. As previously mentioned, alloy steel and nickel are preferred constructional materials and any saving of these expensive building materials is therefore of great importance.

Means are provided for adjusting the temperature of the oil during its passage through the steaming container 102. Such temperature regulating means may, for example, be provided in the preheater 7 and in the individual steaming pipes 10, 11, 13 and 14. Moreover, means are provided for adjusting the amount of steam to be supplied to the individual steaming pipes. The adjusting means provided for this purpose have been indicated in schematic manner on top of FIG. 3, which adjusting means are generally indicated by reference numeral 85. Reference numeral 83 indicates schematically a receptacle for recovering oil droplets which are carried off together with the escaping steam.

Experience has shown that particularly advantageous steaming results are obtained if the temperature in the first steaming pipe 10 is lower than in the subsequent pipes and if the amount of steam supplied to the first steaming pipe 10 is smaller than the amount to be supplied to the subsequent pipes. Further, it has been ascertained that in the last steaming pipe 14, seen in the flow direction, the heating of the oil may be discontinued when the oil has reached the half-way mark of the pipe. Moreover, no further steam has to be supplied after the oil has passed about two-thirds of the length of the last steaming pipe.

Extensive experiments have also indicated that particularly beneficial results are obtained if the steaming pipes are filled with oil up to about 40 to 60% of their height.

For practical purposes, it is advantageous if the entire plant, including the giant pump, the vapor collecting tube and the vacuum unit are operated from a single panel or area. For this purpose, all adjusting and control elements may be provided at one of the end sides of the container 102, for example, at the front end side.

It will be realized, of course, that the described apparatus can be operated discontinuously or by batch operation, although the apparatus is primarily intended for continuous operation. If continuous operation is effected, then the maximum output can be adjusted between 25 and 100% of the maximum capacity by correspondingly adjusting the supply of oil to the steaming container 102 which, as previously mentioned, is effected by suitably setting the dosage arrangement 4. The output of the apparatus is largely dependent on the inner diameter and the length of the steaming pipes and also on the corresponding dimensioning of the other constructional elements of the plant. Applicant has found that an excellent capacity and output are obtained if the inner diameter of the steaming pipes is about 700 mm. while the length of the steaming pipes is about 7000 mm. With a steaming apparatus having such dimensions, an output of about 62 to 76 metric tons per 24 hours is readily achieved, the actual value being dependent on the type of oil to be treated and the desired final purification degree.

From the above description, it will have been realized that the invention provides for an exceedingly simple steaming apparatus for treating oils and fats in a steaming plant to be operated under vacuum conditions. The oil is merely supplied from a storage container to the steaming vessel proper and, if desired, is first conducted through a heat exchanger in counter-current to hot treated oil so as to be preheated before entering the steaming pipes proper. By conducting the flow of the oil to be treated through a plurality of thin-walled tubes to which steam is supplied, the height of the liquid column is reduced to a minimum and the steaming action is more intense and efficient than in prior art apparatus. By repeatedly changing the flow direction, the escape of the contaminants is facilitated. Due to the prevailing vacuum conditions, both inside and outside the steaming pipes, thin-walled steaming pipes can be employed, which results in great saving of material. The central arrangement of the vapor collecting tube 19 results in simplification of the apparatus and increases the output. The arrangement of the various elements within the shell 22 also facilitates the maintenance of the vacuum conditions.

While a specific embodiment of the invention has been shown and described in detail to illustrate the application of the inventive principles, it will be understood that the invention may be embodied otherwise without departing from such principles.

What is claimed is:

1. Apparatus for steam treating oils and the like which comprises, a common horizontally oriented shell, a plurality of steaming pipes arranged within said common shell and extending in substantially horizontal direction, means for supplying steam to each of said steaming pipes, vapor collecting means arranged within said common shell and connected individually to each of said steaming pipes and means for conveying oil to be treated successively through each of said steaming pipes.

2. Apparatus for steam treating oils which comprises, a shell extending in a generally horizontal direction, a plurality of steaming pipes arranged within said shell and extending in parallel planes in the same general direction as said shell, means to supply steam to each of said steaming pipes, vapor collecting means arranged within said shell and connected to each of said steaming pipes, means for passing oil to be treated successively through each of said steaming pipes and vacuum means for maintaining subatmospheric pressure conditions within said vapor collecting means, said steaming pipes and the space enclosed by said shell.

3. Apparatus for steam treating oils which comprises, a common horizontally oriented cylindrical shell, a plurality of horizontally extending steaming pipes arranged within said common shell, means for supplying steam to each of said steaming pipes, vapor collecting means centrally arranged within said common shell and connected individually to each of said steaming pipes, heat exchanging means in said common shell, and means for passing oil to be treated first through said heat exchanging means and thereafter successively through each of said steaming pipes.

4. Apparatus as set forth in the claim 3, wherein the flow of oil in any two successive tubes is in opposite directions.

5. Apparatus adapted for continuous operation for the removal of flavorous and odorous substances from oils, comprising a horizontally extending shell, a plurality of horizontally extending steaming pipes accommodated within said shell and extending in parallel planes, each of said steaming pipes having an inlet side and an outlet side, the inlet side of adjacent tubes being at opposite ends, means for feeding oil to be treated successively to each of said steaming pipes from the inlet side to the outlet side thereof, means to supply steam to each of said steaming pipes, a vapor collecting tube extending in a plane parallel to that of said steaming pipes and being connected to each of said steaming pipes and means for maintaining subatmospheric pressure conditions within said steaming pipes, said vapor collecting tube and the space enclosed by said shell.

6. Apparatus as claimed in claim 5, wherein said vapor collecting tube is centrally arranged within said shell and said steaming pipes are grouped at substantially equal distance around said tube.

7. Apparatus as claimed in claim 5, wherein heat exchange means are arranged within said shell, and means for passing oil to be treated through said heat exchange means.

8. Apparatus as claimed in claim 5, wherein preheating means are arranged within said shell for preheating the oil before it reaches one of said steaming pipes.

9. Apparatus as claimed in claim 5, wherein four steaming pipes are arranged within said shell, two of said steaming pipes being substantially at the same level while the remaining two are arranged at a higher level laterally offset from said first-mentioned two steaming pipes.

10. Apparatus as claimed in claim 9, wherein means are provided for separating said vapor collecting tube into two chambers, two of said steaming tubes being connected to one of said chambers while the remaining two steaming tubes are connected to the other chamber.

11. Apparatus as claimed in claim 5, including heat exchanging means in said shell, and means for feeding hot and cold oil respectively in countercurrent through said heat exchanging means.

12. Apparatus for the continuous steam treatment of oils for the removal of odorous and flavorous substances comprising, a shell, a plurality of horizontally extending steaming pipes arranged within said shell, means for supplying steam to said steaming pipes, means for conveying oil to be treated successively through said steaming pipes with opposite flow direction in adjacent pipes, a vapor collecting tube centrally arranged within said shell and divided into at least two chambers, some of said steaming pipes being connected to one of said chambers, while the remaining steaming pipes are connected to the other of said chambers, heat exchanging means arranged within said shell and means for conducting oil to be treated through said heat exchanging means before the oil reaches the first of said steaming pipes, preheating means for heating oil before it reaches said steaming pipes and means for maintaining vacuum within said steaming pipes, said vapor collecting tube and the space defined by said shell.

13. Apparatus as in claim 12, wherein the vapor collecting tube has a widened exit portion.

14. Apparatus as in claim 12, wherein said vapor collecting means is connected with said steaming pipes at the highest circumferential point of said pipes.

15. Apparatus as claimed in claim 12, wherein said means for supplying steam to said steaming pipes comprises steam supply tubes having obliquely downwardly directed exit openings.

16. Apparatus as claimed in claim 12, wherein heating means are provided for indirectly heating the oil within said steaming pipes.

17. In a plant operated under vacuum conditions for the removal of undesired contaminants from oil by steaming, the improvement which comprises a steaming vessel having a horizontally extending common shell, a plurality of horizontally extending steaming pipes accommodated within said common shell, means to supply steam to each of said steaming pipes, a vapor collecting tube centrally and coaxially arranged within said common shell, connecting means for connecting said vapor collecting tube individually to each of said steaming pipes, and means for conveying oil to be treated successively through each of said steaming pipes, the flow in successive pipes being in opposite directions.

18. In a plant as claimed in claim 17, wherein heat exchanger means are provided within said common shell for heating said oil.

References Cited by the Examiner
UNITED STATES PATENTS

| | | | |
|---|---|---|---|
| 1,028,738 | 6/12 | Kestner | 159—14 |
| 1,335,769 | 4/20 | Wellman | 196—127 |
| 1,560,891 | 11/25 | Bagwill | 196—127 X |
| 1,594,014 | 7/26 | Kabernik | 196—127 X |
| 1,613,010 | 1/27 | Armstrong | 196—127 X |
| 1,969,793 | 8/34 | Hechenbleikner | 202—52 X |
| 2,078,841 | 4/37 | Fauth | 202—52 X |
| 2,088,239 | 7/37 | Hess | 202—205 |
| 2,385,074 | 9/45 | Guignard | 202—173 X |
| 2,621,196 | 12/52 | Thurman | 202—47 |
| 2,674,609 | 4/54 | Beal et al. | 202—46 X |
| 2,759,883 | 8/56 | Thurman | 202—46 |
| 2,894,830 | 7/59 | Sisson et al. | 202—173 X |

FOREIGN PATENTS

| | | |
|---|---|---|
| 404,547 | 1/34 | Great Britain. |
| 119,028 | 6/47 | Sweden. |
| 188,608 | 1/37 | Switzerland. |

NORMAN YUDKOFF, *Primary Examiner.*

ALPHONSO SULLIVAN, *Examiner.*